US006943535B1

(12) United States Patent
Schiff (10) Patent No.: US 6,943,535 B1
(45) Date of Patent: Sep. 13, 2005

(54) MULTIPLE-PHASE DC-DC CONVERTER TOPOLOGY

(75) Inventor: Tod F. Schiff, Portland, OR (US)

(73) Assignee: Analog Devices, Inc., Norwood, MA (US)

( * ) Notice: Subject to any disclaimer, the term of this patent is extended or adjusted under 35 U.S.C. 154(b) by 151 days.

(21) Appl. No.: 10/688,139

(22) Filed: Oct. 16, 2003

Related U.S. Application Data

(60) Provisional application No. 60/419,330, filed on Oct. 17, 2002.

(51) Int. Cl.[7] .............................................. G05F 1/10
(52) U.S. Cl. ........................ 323/246; 323/244; 323/285
(58) Field of Search ................................ 323/240, 244, 323/246, 271, 272, 283, 284, 285, 351; 363/10, 363/41

(56) References Cited

U.S. PATENT DOCUMENTS

| | | | | |
|---|---|---|---|---|
| 4,760,321 A | * | 7/1988 | Tanaka et al. ................. | 363/10 |
| 5,355,295 A | * | 10/1994 | Brennen ....................... | 363/40 |
| 5,770,940 A | | 6/1998 | Goder ......................... | 323/282 |
| 5,847,554 A | | 12/1998 | Wilcox et al. ............... | 323/282 |
| 5,929,692 A | | 7/1999 | Carsten ....................... | 327/531 |
| 5,982,160 A | | 11/1999 | Walters et al. ............... | 323/282 |
| 6,144,194 A | | 11/2000 | Varga ......................... | 323/285 |
| 6,747,442 B2 | * | 6/2004 | Olsen et al. ................. | 323/283 |

OTHER PUBLICATIONS

Analog Devices, "5-Bit Programmable 2-Phase Synchronous Buck Controller", ADP3160/ADP3167, 2002, pp. 16 (no month).
Semiconductor Components Industries, LLC2002, Three-Phase Buck Controller with Integrated Gate Drivers and Power Good, CS5301, pp. 1-19 (no month).
Intersil, Microprocessor Core Voltage Regulator Multi-Phase Buck PWM Controller, HIP6301, 2002, pp1-18 (no month).

* cited by examiner

Primary Examiner—Jessica Han
(74) Attorney, Agent, or Firm—Koppel, Jacobs, Patrick & Heybl (57) ABSTRACT

A multiple-phase DC—DC converter adds at least one additional phase to an N-phase DC—DC converter to improve the converter's response to changes in load. In one embodiment, an additional phase operates at a switching frequency greater than that of the N phases, to generate a current which is added to the N phase currents to improve the converter's response to changes in load. In another embodiment, an additional phase is configured to improve the converter's response to a load release. Here, the additional phase is kept off during load increase and steady-state conditions. However, when a load release occurs, the additional phase is turned on and acts to extract current from the converter's output terminal while the N phase currents slowly fall, to reduce the magnitude of output voltage overshoot that occurs on load release.

21 Claims, 9 Drawing Sheets

MULTIPLE-PHASE DC-DC CONVERTER TOPOLOGY

REFERENCE TO EARLIER APPLICATION

This application claims the benefit of provisional patent application No. 60/419,330 to T. Schiff, filed Oct. 17, 2002.

BACKGROUND OF THE INVENTION

1. Field of the Invention

This invention relates to the field of switching voltage regulators, and particularly to multiple-phase DC—DC converters.

2. Description of the Related Art

Advanced microprocessors typically require power supplies that provide a low voltage (e.g., <2 volts) at high current. The trend is for these supply voltages to continue to fall, while the current demand increases.

The load a high speed processor presents to a power supply can go from low to high or vice versa in a very short time, particularly when running demanding software programs. One way in which high currents are provided is with a multiple-phase switching regulator, in which the components of a number (N) of single-phase regulators are repeated to produce N output currents, which are summed together to provide the total output current. The phases are operated in parallel, and are synchronously switched so as to reduce the overall input and output ripple, as well as deliver large output currents.

Ideally, the power supply for a high speed processor will be highly efficient, as well as quickly responsive to changes in load. For a multiple-phase switching regulator to have high efficiency, low ripple currents and low switching frequencies are desired to keep switching losses low. But a regulator having low switching frequencies and ripple currents typically requires the use of large output inductors, and tends to respond slowly to load changes. Transient response is improved with the use of a higher output filter capacitance, but this adds cost and requires space.

Alternatively, a designer can achieve high efficiency using small inductors with a high switching frequency. This allows the converter to respond quickly with a minimal amount of output filter capacitance. However, to deliver high currents, expensive high switching speed components must be used to keep efficiency high, or more phases must be used to lower the current per phase and improve the power losses—again adding cost.

Figure 1A:
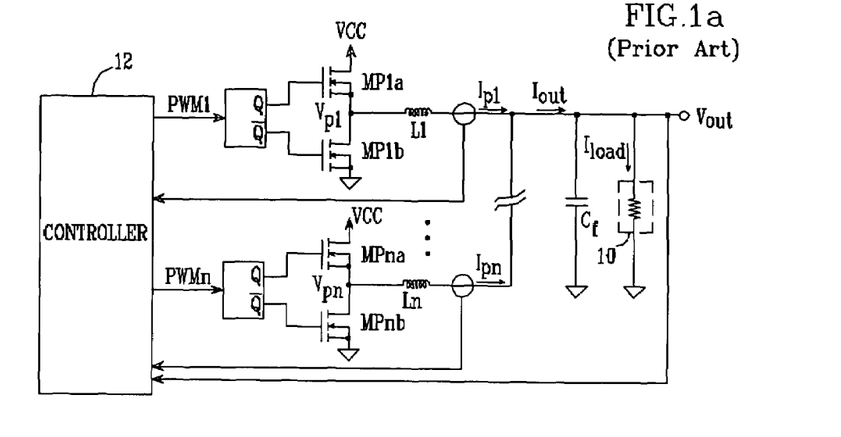
FIG. 1a is a schematic/block diagram of a known multiple-phase switching regulator.
Figure 1B:
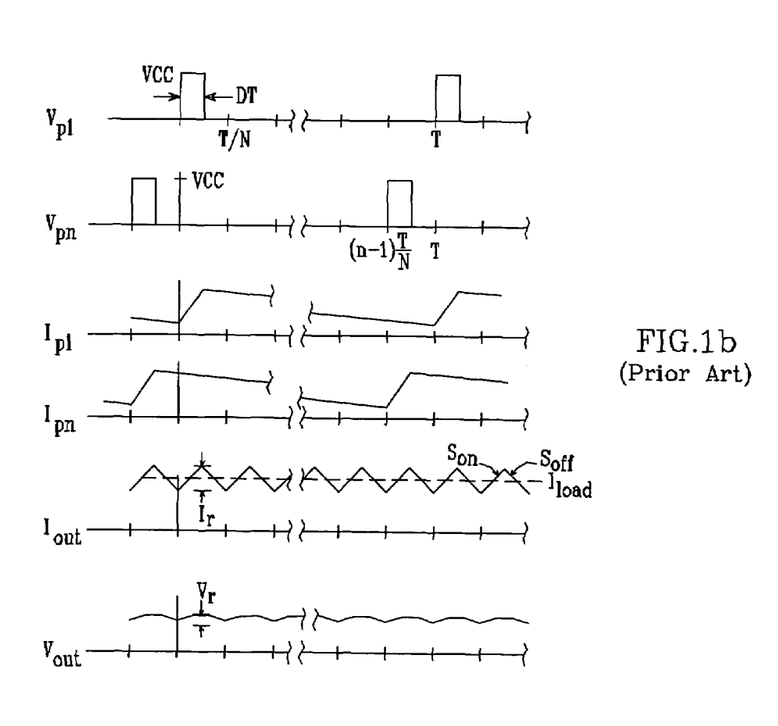
FIG. 1b is a timing diagram illustrating the operation of the known regulator of FIG. 1a under steady-state conditions.
Figure 1C:
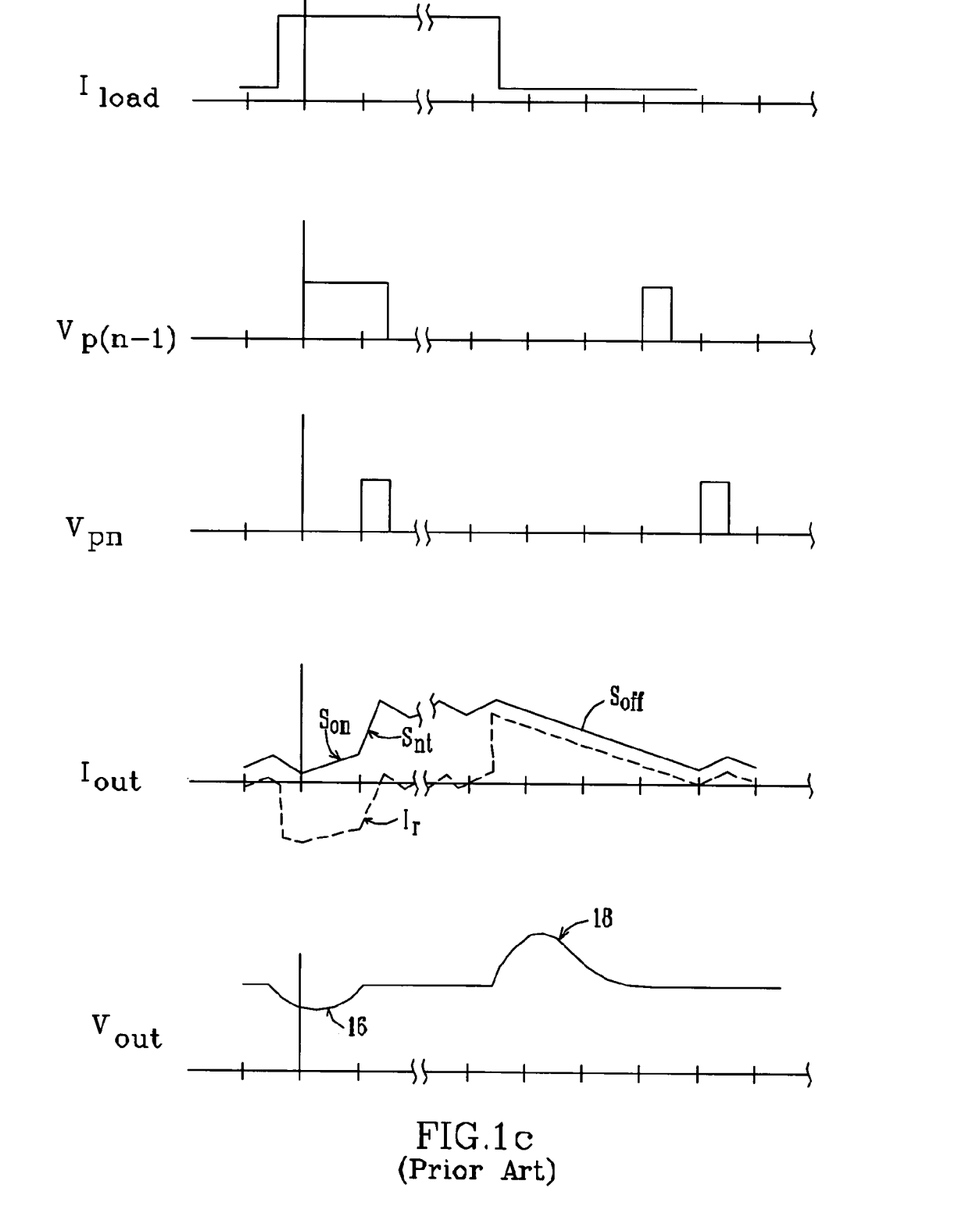
FIG. 1c is a timing diagram illustrating the operation of the known regulator of FIG. 1a in response to a changing load.

One problem associated with the responsiveness of a switching converter to changes in load is illustrated in FIGS. 1a-1c. A basic DC—DC converter having N phases is shown in FIG. 1a. Each phase includes a pair of switching transistors (MP1a/MP1b, ..., MPna/MPnb) which are alternately operated to conduct current to and from an output inductor (L1, ..., Ln) to produce respective phase currents ($I_{p1}$, ..., $I_{pn}$). The individual currents are summed together to produce an overall output current $I_{out}$, which is filtered with a filter capacitance $C_f$ to provide a regulated output voltage $V_{out}$ and drive a load 10. A controller 12 provides respective control signals (PWM1, ..., PWMn) to operate the switching transistors.

The operation of the converter in FIG. 1a under steady-state conditions is shown in FIG. 1b. The phases are enabled in sequence, with each phase enabled once in a period T. The duration of each phase's on-time is given by DT, where D is the duty cycle. When ND<1, the voltages ($V_{p1}$, ..., $V_{pn}$) at the junctions of the switching transistor pairs are as shown in FIG. 1b. These voltages result in the phase currents ($I_{p1}$, ..., $I_{pn}$) shown. Summing the phase currents together results in output current $I_{out}$, which has a ripple current $I_r$, and produces an output voltage $V_{out}$ having a ripple voltage $V_r$. When so arranged, the normal output current ripple slew rate (i.e., slope) when a phase is switched on (i.e., current conducted from VCC to the phase's output inductor), $S_{on}$, is given by:

$S_{on}=(1-ND)(VCC/L)$ amps/second, where VCC is the converter's input voltage. The normal output current ripple slew rate when all phases are switched off (i.e., current conducted from all output inductors to ground), $S_{off}$, is given by:

$S_{off}=(-ND)(VCC/L)$ amps/second.

The operation of the converter for a change in output load is shown in FIG. 1c. When the demand for load current ($I_{load}$) increases, the duty cycles of one or more phases are increased to provide more DC output current. This can result in more than one phase being on at a time, such that, when the load current increases sharply, the "turn-on" output current slew rate $S_{nt}$ is greater than $S_{on}$ and is given by:

$S_{nt}=(M-ND)(VCC/L)$ amps/second, where M is the number of phases turned on by the change in the output load. This is seen on the plot of $I_{out}$, which reflects the transition from $S_{on}$ to $S_{nt}$ as $I_{out}$ increases (M=2 for the example shown). Also shown on the $I_{out}$ plot is ripple current $I_r$, which varies with the difference between $I_{out}$ and $I_{load}$.

However, the "turn-off" output current slew rate, applicable when there is a sharp decrease in load current, is limited to $S_{off}$. This results in a large error between $I_{out}$ and $I_{load}$, with the error reduced at the $S_{off}$-limited rate. As such, the converter responds faster to a load change increase (load step) than it does to a load change decrease (load release): $V_{out}$ exhibits a small undershoot 16 during a load step, but a large overshoot 18 of long duration during a load release.

This large overshoot is not acceptable for most designs. By increasing the output filter capacitance $C_f$, this overshoot can be removed but requires additional cost for the design. This increase in capacitance, however, is not required for the converter's response to a load step.

SUMMARY OF THE INVENTION

A multiple-phase DC—DC converter topology is presented which overcomes the problems noted above. The invention adds at least one additional phase to an N-phase DC—DC converter to improve the converter's response to changes in load.

In one embodiment, one or more additional phases are operated at a switching frequency greater than that of the N "main" phases, to generate a current $I_{add}$ which is added to the N phase currents. This "high speed" current acts to improve the converter's response to changes in load. The additional phase or phases enables the lower speed main phases to be optimized for efficiency and cost, with the additional phases optimized for responsiveness and cost.

Preferably, the additional phases are operated at a switching frequency an integer multiple of that of the main phases, with the main and additional phases driven with the same control circuit. Current $I_{add}$ may be an AC current, which enables the additional phase's switching components to be smaller and cheaper, or a DC current, which enables the additional phase to be used as the sole source of output current for low load conditions.

In another embodiment, one or more additional phases are configured to improve the converter's response to a load release. The additional phase is kept off during load increase and steady-state conditions. However, when a load release occurs such that the duty cycles of the main phases fall to near zero, the additional phase is turned on and acts to extract current from the converter's output terminal while the N phase currents slowly fall, to reduce the magnitude of the output voltage overshoot that occurs on load release.

Further features and advantages of the invention will be apparent to those skilled in the art from the following detailed description, taken together with the accompanying drawings.

DETAILED DESCRIPTION OF THE INVENTION

Figure 2:
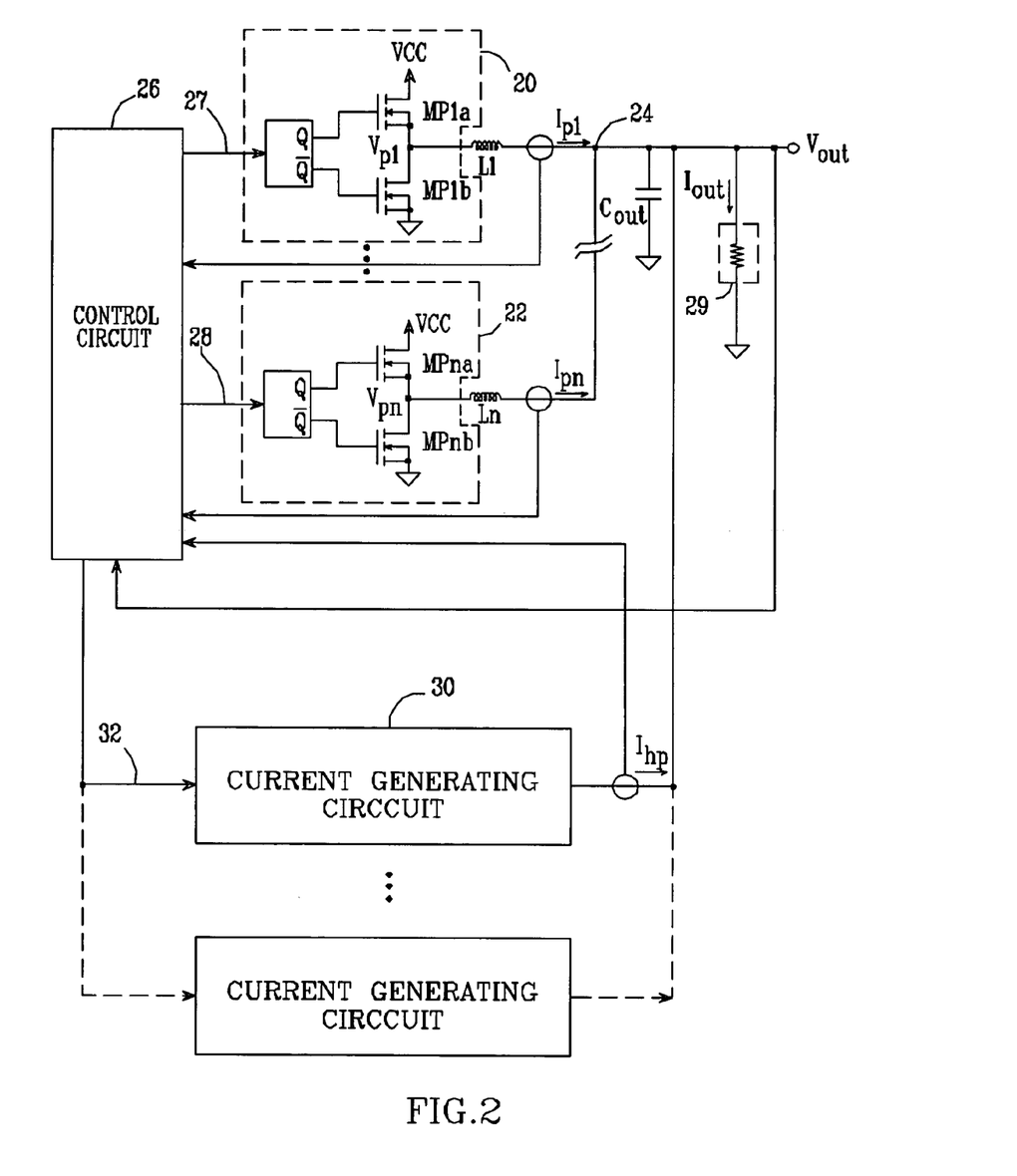
FIG. 2 is a schematic/block diagram of a multiple-phase DC—DC converter per the present invention.

A schematic/block diagram illustrating the principles of a multiple-phase DC—DC converter in accordance with the present invention is shown in FIG. 2. The number of main phases is identified herein as "N". For each phase, the regulator includes a switching circuit (20, 22) made up of one or more switching transistors (MP1a/MP1b, ..., MPna/MPnb), with each switching circuit connected to one side of a respective output inductor (L1, ..., Ln). The opposite, "output" sides of the inductors are connected together at a common output terminal 24. The N switching circuits are operated by a control circuit 26, which provides respective control signals 27, 28 to the switching circuits so as to generate respective phase currents $I_{p1}, ..., I_{pn}$. The N phase currents are summed together at terminal 24 and thereby provide an output voltage $V_{out}$ and a total output current $I_{out}$, suitable for driving a load 29. The converter normally includes a filter capacitor $C_{out}$ to reduce the ripple voltage component of output voltage $V_{out}$.

The present DC—DC converter includes at least one additional phase 30, which is arranged to provide a current $I_{hp}$ to output terminal 24 so as to improve some aspect of the converter's performance, in response to a control signal 32 received, for example, from control circuit 26. For example, additional phase 30 can provide a positive current which increases the speed with which the converter responds to changes in load. Alternatively, additional phase 30 can provide a negative current which extracts current from output terminal 24 upon the occurrence of a load release, to reduce the magnitude and duration of output voltage overshoot which might otherwise occur.

Figure 3A:
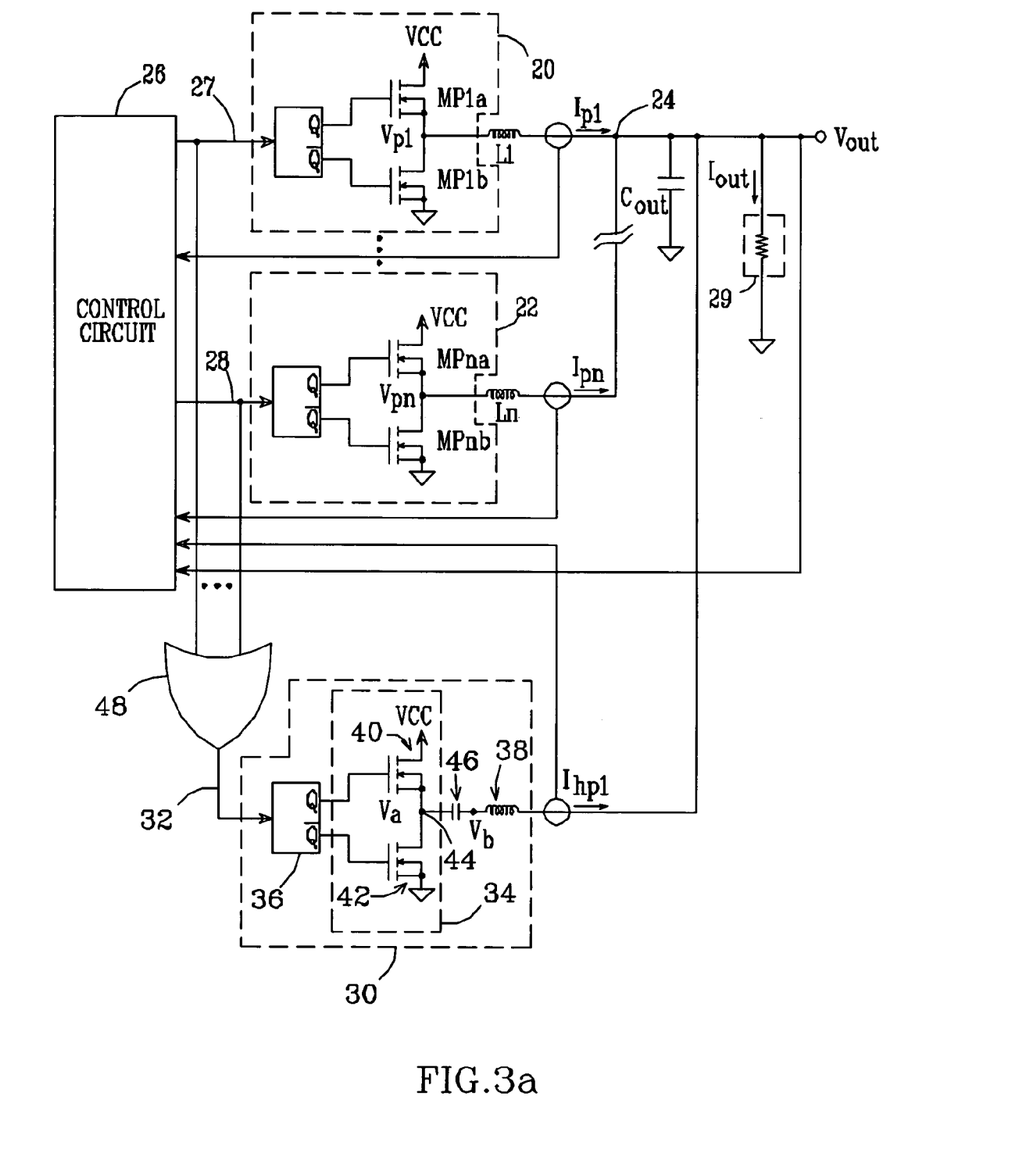
FIG. 3a is a more detailed embodiment of a multiple-phase DC—DC converter per the present invention.

One possible embodiment of the present invention is shown in FIG. 3a. A DC—DC converter is configured as before, with N main phases providing respective phase currents $I_{p1}, ..., I_p$, to a common output terminal 24 in response to control signals (27,28) received from a control circuit 26. The N control signals are generated during a switching cycle which has a period T and a frequency f1; the control signals are phase-shifted by T/N with respect to each other, such that the phases are operated in parallel and are synchronously switched.

Additional phase 30 generates a current $I_{hp1}$ which ramps up and down in response to a control signal 32 having a switching frequency f2 which is equal to or greater than f1. Current $I_{hp1}$ is summed with the N phase currents to provide output current $I_{out}$ to the load 29 connected to output terminal 24. Because additional phase 30 is operated at a higher switching frequency than the N phases, its current $I_{hp1}$ quickly provides energy to output terminal 24, which improves the converter's response to load changes.

With the additional phase's "high speed" current acting to improve the converter's response to changes in load, the lower speed main phases are preferably optimized for efficiency and cost. Thus, the main phases preferably use larger inductors and MOSFETs, which result in low ripple currents and lower losses. The additional phase is preferably optimized for responsiveness and cost, such that it uses inductors and MOSFETs smaller than those used in the main phases.

FIG. 3a shows one possible implementation of additional phase 30. A switching circuit 34 is arranged to be operated in response to control signal 32, preferably via a switching transistor driver 36, to conduct current to and from an output inductor 38 and thereby generate current $I_{hp1}$. The switching circuit preferably includes a pair of switching transistors (40, 42) connected between supply voltages such as VCC and ground, with the transistors connected together at a common node 44. The transistors are operated by the complementary outputs of the driver 36. Additional phase 30 may optionally include a capacitor 46 connected between node 44 and output inductor 38.

Figure 3B:
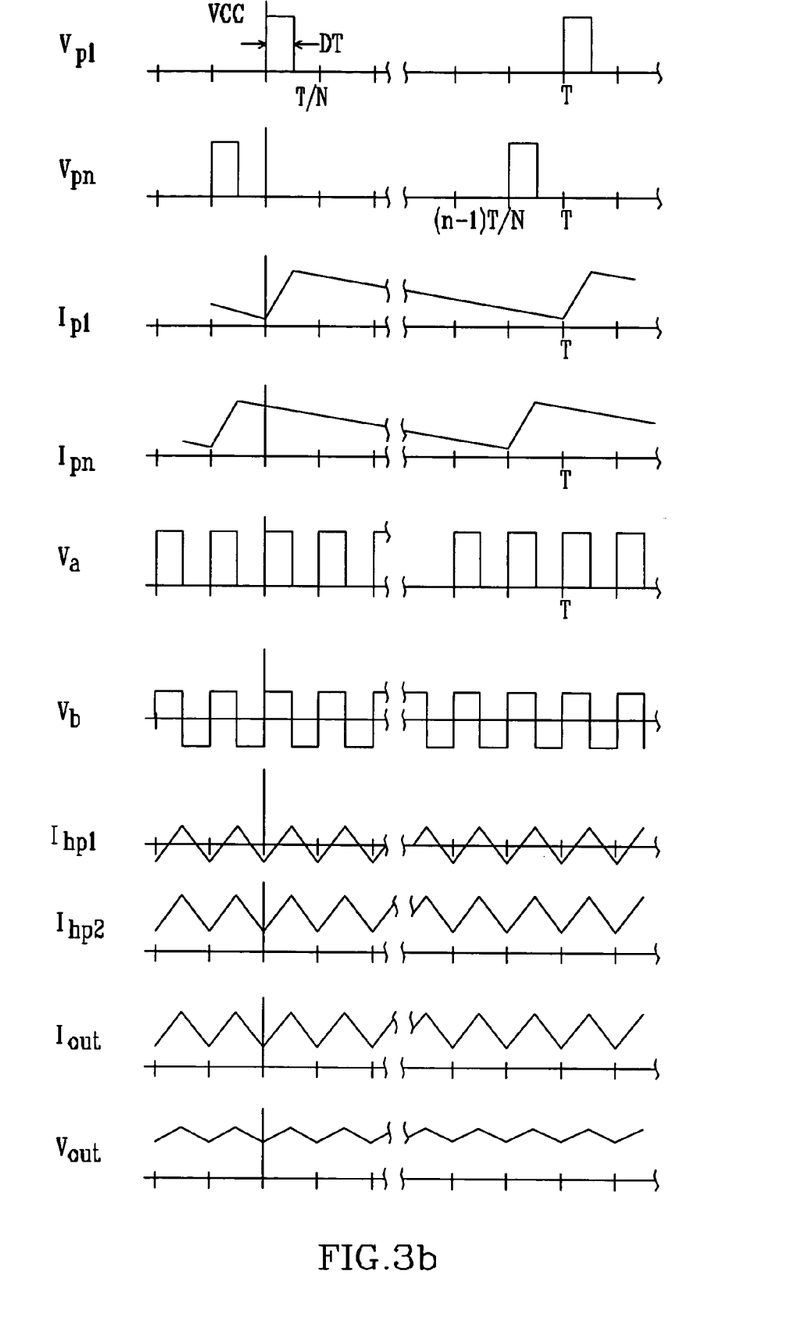
FIG. 3b is a timing diagram illustrating the operation of the present DC—DC converter.

FIG. 3b is a timing diagram illustrating the operation of the converter shown in FIG. 3a. The phase-shifted control signals (27,28) produce voltages $V_{p1}, ..., V_{pn}$ in the N phases, which generate respective phase currents $I_{p1} ..., I_{pn}$. The N control signals, as well as the resulting phase currents, occur during a switching cycle having a period T and a frequency f1(=1/T). As noted above, additional phase 30 is driven with a control signal 32 having a frequency f2 which is equal to or greater than f1. Control signal 32 is preferably provided by combining the N control signals together, using a logic gate 48, for example, which enables control signal 32 to be provided with the same control circuit 26 that provides the N control signals. When so arranged, the resulting control signal 32 has a frequency f2, given by f2=N*f1, with each pulse having the same duty cycle as its source control signal. Alternately, the logic gate 48 could be integral to control circuit 26.

Switching transistors 40 and 42 are switched on and off at frequency f2, which results in a voltage $V_a$ appearing at common node 44; $V_a$ toggles between VCC and ground. The use of a capacitor 46 between common node 44 and output inductor 38, as shown in FIG. 3a, removes the DC component in voltage $V_a$, resulting in an AC voltage $V_b$ on the input side of inductor 38. This AC voltage becomes AC current $I_{hp1}$ on the output side of inductor 38, which is provided to output terminal 24.

The present invention is preferably employed with a DC—DC converter that uses a pulse-width modulation (PWM) control scheme, such that the duty cycles of the N control signals (27, 28) vary with the load. When so arranged:

- when the output load is constant, the control signals' (27,28,32) duty cycles are constant, so that the average $I_{hp}$ current is zero and the average $I_p$ current is at a steady-state DC value.
- when the output load increases, the duty cycles increase so that the average $I_{hp}$ current becomes greater than zero (and helps to quickly accommodate the load transient) and the average $I_p$ current increases (though more slowly than $I_{hp}$).
- when the output load decreases, the duty cycles decrease so that the average $I_{hp}$ current becomes less than zero (and helps to quickly accommodate the load transient) and the average $I_p$ current decreases (though more slowly than $I_{hp}$).
- in the case of a load release (i.e., a step decrease in load), the duty cycles—and thus the $I_p$ and $I_{hp}$ currents—might actually go to zero for a period of time.

Current $I_{hp1}$ has a switching frequency equal to f2; as such, $I_{hp1}$ also gives $I_{out}$ and $V_{out}$ an f2 component (as shown in FIG. 3b). The higher frequency of $I_{hp1}$ with respect to phase currents $I_{p1}$ . . . , $I_{pn}$ enables it to improve the responsiveness of the converter to changes in load, by providing fast AC currents during fast load changes. The higher switching frequency also enables inductor 38 to be smaller than those found in the N main phases, and also allows the use of a smaller output capacitor $C_{out}$. The output capacitor supplies the initial energy required to accommodate a load change: when additional phase 30 has a high slew rate (due to its higher switching frequency and smaller inductor), it will start supplying energy (via $I_{hp1}$) fast enough to allow output capacitor $C_{Out}$ to have a smaller capacitance than might otherwise be needed.

Figure 3C:
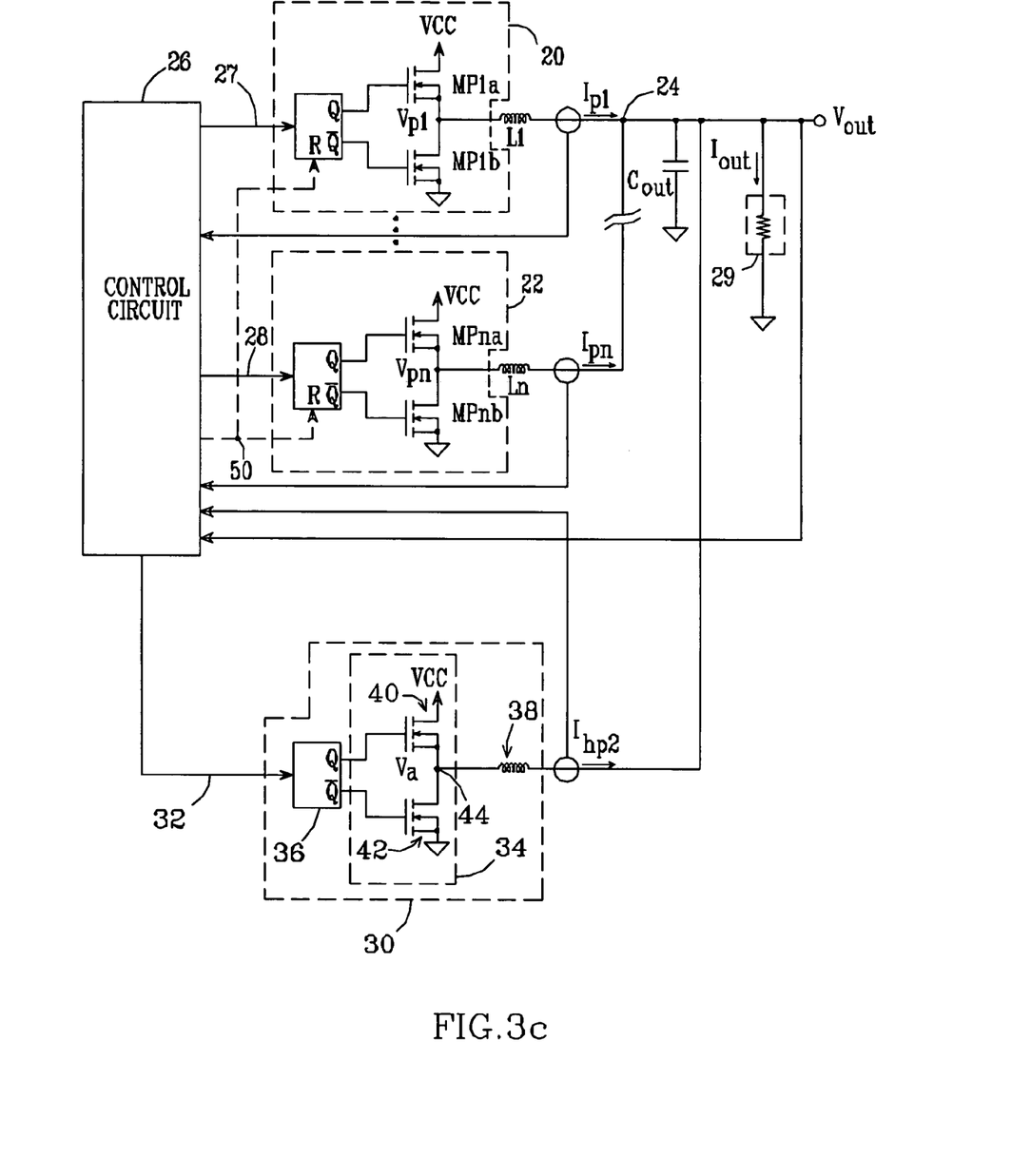
FIG. 3c is an alternative embodiment of a multiple-phase DC—DC converter per the present invention.

The use of capacitor 46 in additional phase 30 keeps the DC component of $I_{hp1}$ zero or very small, which enables the use of smaller, faster switching transistors and a smaller inductor 38. However, it is not essential that capacitor 46 be used or that the output current of additional phase 30 be purely an AC current. An embodiment of the invention without such a capacitor is shown in FIG. 3c. Here, additional phase 30 is identical to the additional phase shown in FIG. 3a, except that node 44 is now connected directly to inductor 38 without an intervening capacitor.

With capacitor 46 removed, additional phase 30 produces an output current $I_{hp2}$ which includes both AC and DC components, and thus affects both the AC and DC components of overall output current $I_{out}$. Current $I_{hp2}$ is shown in the FIG. 3b timing diagram. Note that the DC component of current $I_{hp2}$ may require that switching transistors 40 and 42 and inductor 38 be larger than those used in FIG. 3a. Here, control signal 32 can still be a multiple of f1, but its duty cycle needs to be controlled based on the DC current in inductor 38, so as to prevent inductor saturation by limiting the amount of current in the inductor.

The embodiment of FIG. 3c might alternatively be configured and operated such that additional phase 30 provides all of output current $I_{out}$ under very small load conditions. In this case, the additional phase is preferably designed to have a higher efficiency than the N main phases, with a larger inductor and MOSFETs. Control circuit 26 is arranged to deactivate the N phases when there is a small load on the output by, for example, asserting a disable signal 50 which inhibits the switching of the N switching circuits. This yields a more efficient converter at light loads, since the switching losses associated with the constant switching of the N main phases is avoided.

The invention is useful with a number of converter control schemes. A pulse-width modulation (PWM) architecture is preferred, though not essential. For example, the invention is also useful with variable frequency architectures such as pulse-frequency modulation (PFM).

Though the present converter is shown with only one additional phase, more than one additional phase might also be employed. For example, a DC—DC converter might include two or more additional phases 30 connected in parallel, with each driven by control signal 32 and the output of each summed into $I_{out}$. Multiple additional phases connected in this way could provide more high-speed current than could a single additional phase, while enabling the switching components in each additional phase to remain small.

It was noted above that, for a conventional DC—DC converter such as that shown in FIG. 1a, the converter responds faster to a load change increase (load step) than it does a load change decrease (load release): i.e., $V_{out}$ exhibits a small undershoot during a load step, but a large overshoot of long duration during a load release. The embodiment of the present invention shown in FIG. 4a overcomes this problem. As before, the converter has N main phases, each of which includes a switching circuit (20,22) and an output inductor (L1, . . . , Ln), and which produce respective phase currents $I_{p1}, \ldots, I_p$, that are summed at an output node 24. Each switching circuit is driven with a respective pulse-width modulated (PWM) control signal PWM1, . . . , PMNn provided by a control circuit 60. In this embodiment, control circuit 60 also provides a clock signal Fclk which pulses once at the start of each of the N control signals' switching periods. A logic gate 62 combines all of the N control signals into a single control signal Fpwm, which toggles when any of the N control signals toggles.

Figure 4A:
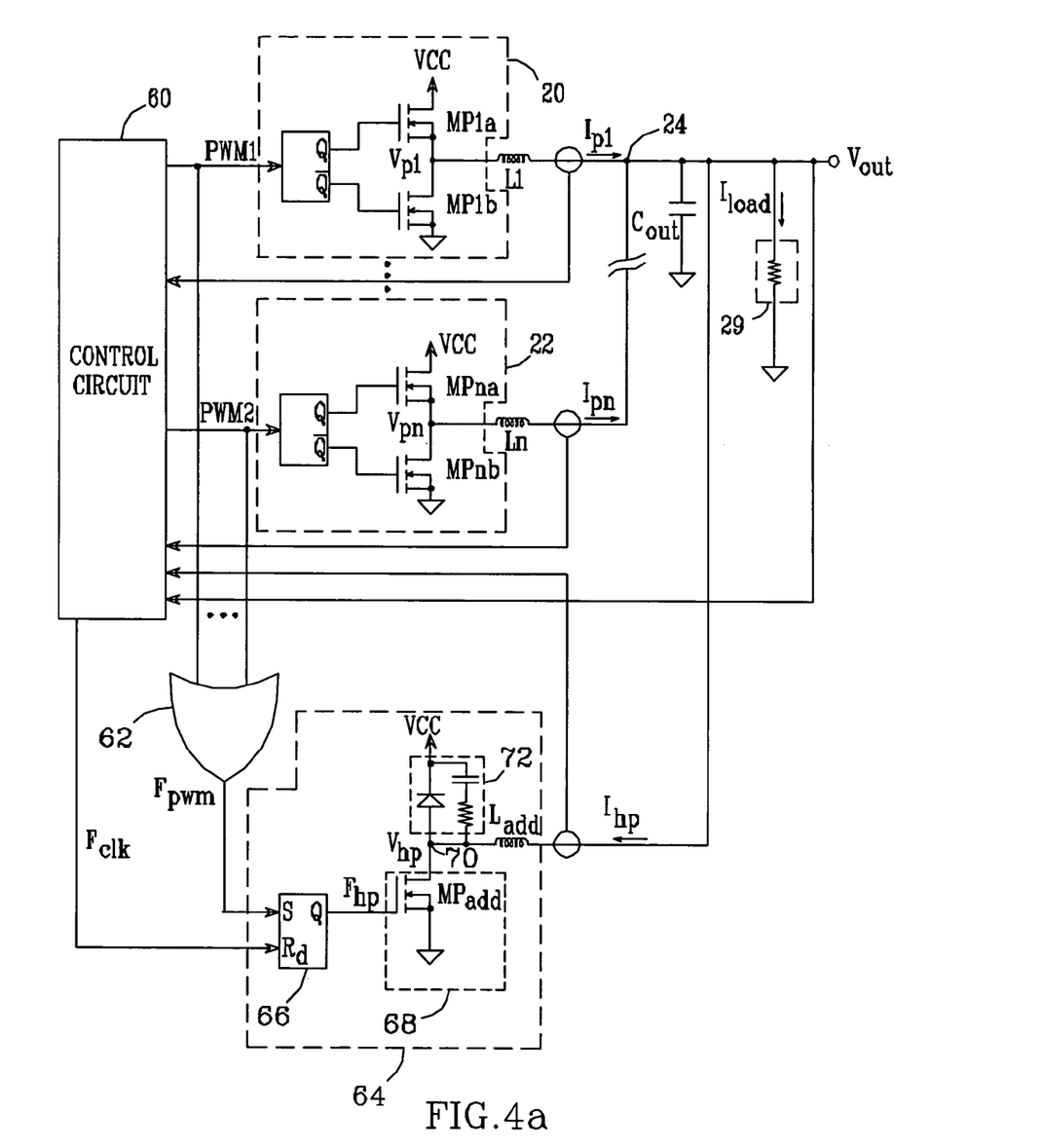
FIG. 4a is another alternative embodiment of a multiple-phase DC—DC converter per the present invention.

The embodiment also includes at least one additional phase 64 which improves the response of the converter to a load release. Additional phase 64 includes a "reset-dominate" flip-flop 66, the Q output of which is held low whenever its reset input ($R_d$) is high—regardless of the state of its set input (S). The Q output of flip-flop 66 controls a switching circuit 68; preferably a transistor $MP_{add}$. Switching circuit 68 is connected to an output inductor $L_{add}$ at a node 70; when closed, switching circuit 68 connects inductor $L_{add}$ between output node 24 and ground and conducts a current $I_{hp}$. Additional phase 64 also preferably includes a recovery circuit 72 connected between node 70 and a supply voltage such as VCC.

Figure 4B:
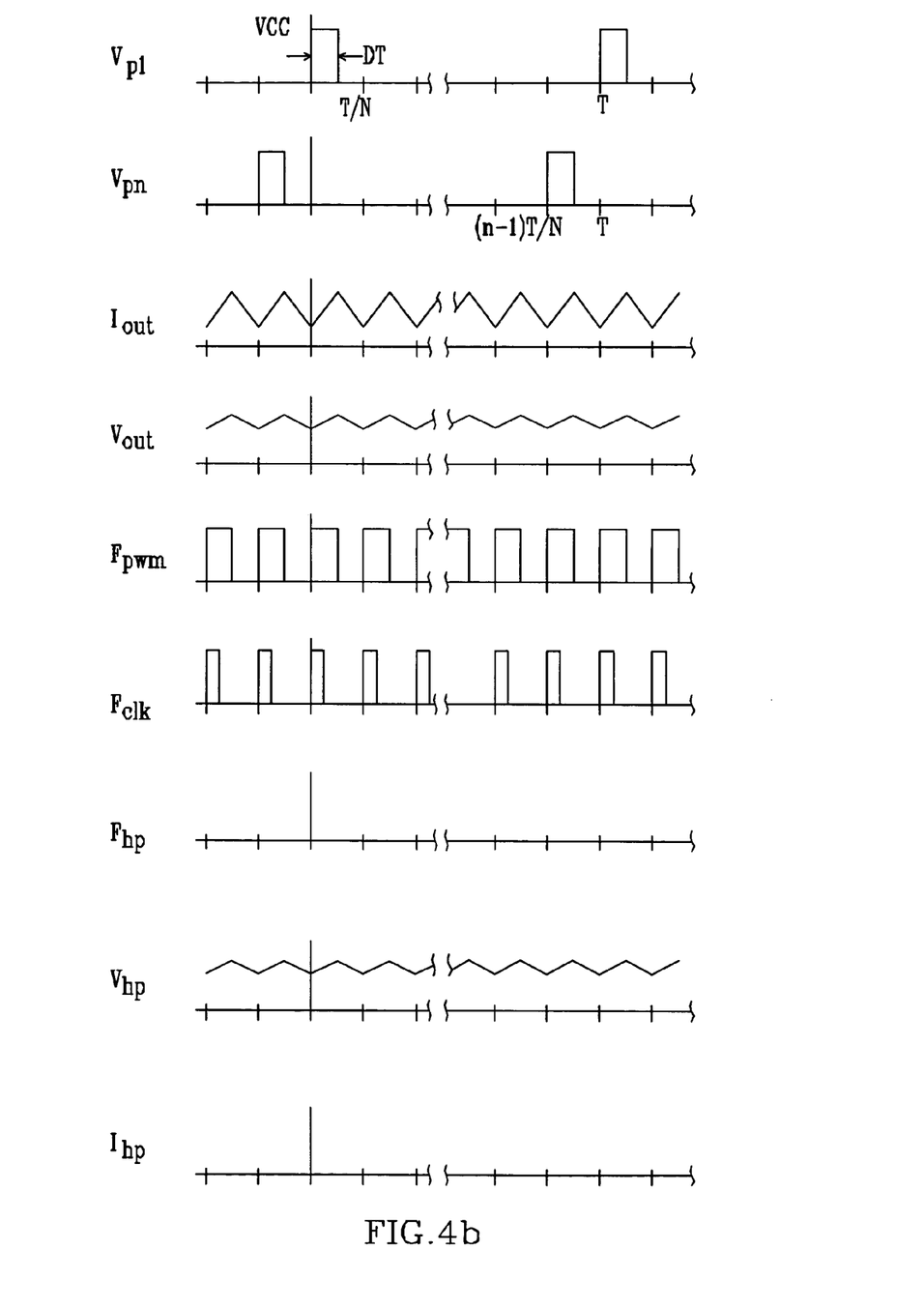
FIG. 4b is a timing diagram illustrating the operation of the converter of FIG. 4a under steady-state conditions.

The operation of the converter shown in FIG. 4a under steady-state conditions is shown in FIG. 4b; the duty cycle D(=$V_{out}$/VCC) is such that ND<1. As before, the phases are synchronously switched such that the voltages $V_{p1}, \ldots, V_p$ on the switch sides of the N output inductors are staggered throughout the period T of the converter's switching cycle, with the duration of each voltage pulse given by DT. This results in respective phase currents $I_{p1}, \ldots, I_{pn}$ (not shown), which are summed together at node 24 to provide output current $I_{out}$ and output voltage $V_{out}$ to load 29. The output Fpwm of logic gate 62 combines each of individual control signals PWM1, ..., PWMn, with the pulse width of each constituent pulse equal to that of its source pulse.

Clock signal Fclk and signal Fpwm are generated synchronously such that, under steady-state conditions, Fpwm will always be high when Fclk goes high. Under these conditions, reset-dominate flip-flop 66 is kept continuously reset. This keeps the flip-flop's Q output (voltage $F_{hp}$) low and switch 68 off. As a result, no current $I_{hp}$ is conducted by additional phase 64, and the voltage $V_{hp}$ at node 70 simply tracks $V_{out}$.

Figure 4C:
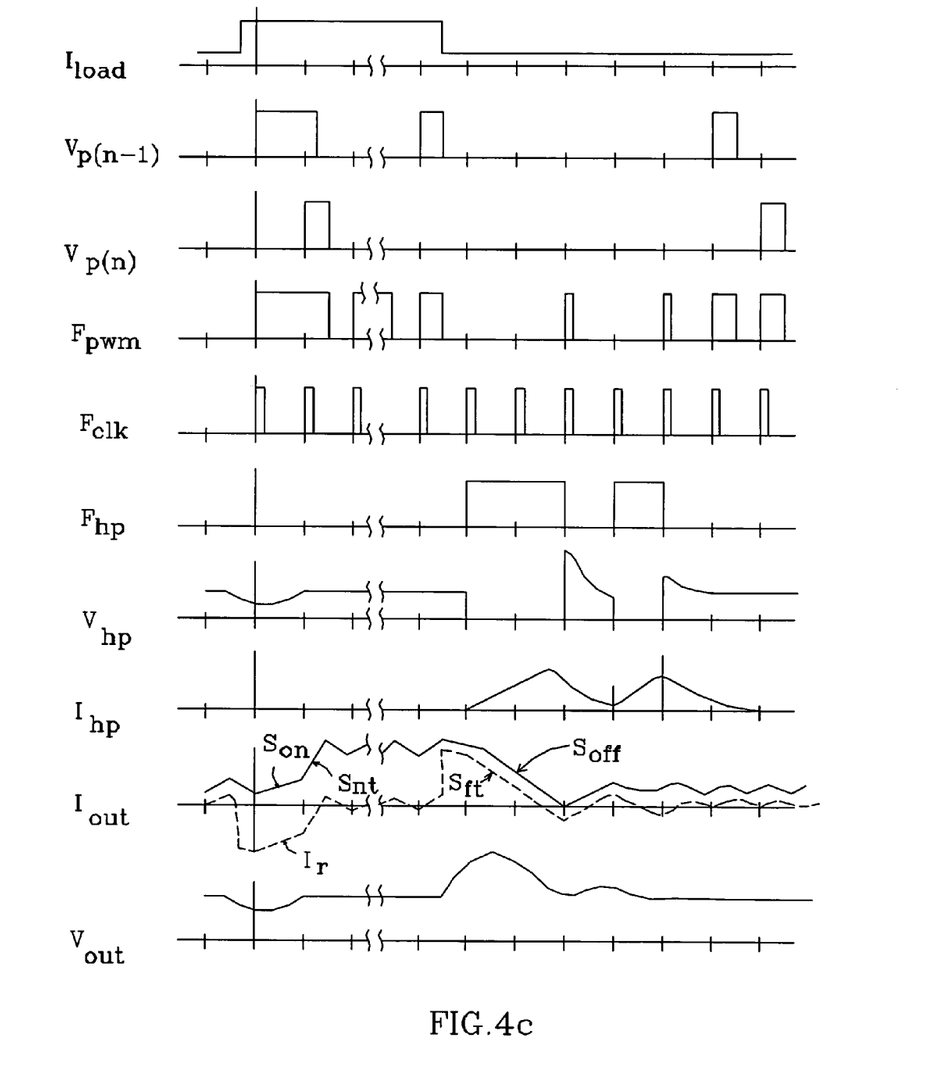
FIG. 4c is a timing diagram illustrating the operation of the regulator of FIG. 4c in response to a changing load.

The operation of the converter shown in FIG. 4*a* with a changing load is shown in FIG. 4*c*. The converter responds as described above in relation to FIG. 1*c*: prior to the load step, output current $I_{out}$ ramps up at a slew rate $S_{on}$ given by:

$$S_{on}=(1-ND)\ (VCC/L)\ \text{amps/second},$$

where VCC is the converter's input voltage and L is the inductance of the output inductors. Upon the occurrence of a load step, when the demand for load current ($I_{load}$) increases, the duty cycles of one or more phases are increased to provide more DC output current. This can result in more than one phase being on at a time, such that the "turn-on" output current slew rate $S_{nt}$ is greater than $S_{on}$ and is given by:

$$S_{nt}=(M-ND)\ (VCC/L)\ \text{amps/second, where M is the number}$$

of phases that are on.

This is seen on the plot of $I_{out}$, which reflects the transition from $S_{on}$ to $S_{ft}$ as $I_{out}$ increases. Also shown on the $I_{out}$ plot is current in the output capacitor, Cout, shown as $I_r$ which varies with the difference between $I_{out}$ and $I_{load}$.

While $I_{load}$ is high, control signals PWM1, ..., PWMn are generated during each switching period. As such, Fpwm is high for each occurrence of Fclk, such that Fpwm keeps flip-flop 66 reset. This keeps $F_{hp}$ low and switching circuit 68 open, so that $V_{hp}$ simply tracks $V_{out}$.

Additional phase 64 becomes active upon the occurrence of a load release. In response to a load release, the N PWM control signals PMN1, ..., PWMn all turn off, causing Fpwm to be low for one or more switching periods. Now, when Fclk pulses with Fpwm low, flip-flop 66 is set, voltage $F_{hp}$ goes high, and switching circuit 68 is closed and conducts the additional phase's output current $I_{hp}$, which increases at a slew rate $S_{hp}$. After a load release, there is a period of time during which the N phases continue to provide their respective phase currents to output node 24, causing $V_{out}$ to overshoot. Current $I_{hp}$ acts to extract current from output node 24 during this period of time, thereby reducing $I_{out}$ and the magnitude and duration of the $V_{out}$ overshoot. With additional phase 64 active, the turn-off slew rate is improved. During this period, the turn-off slew rate $S_{ft}$ is given by:

$$S_{ft}=S_{off}-S_{hp}=-[(N/L)+(1/L_{add})]*D*VCC.$$

Once output voltage $V_{out}$ is brought back within regulation, control circuit 60 begins generating PWM control signals again, causing the Fpwm signal to pulse and reset flip-flop 66, which opens switching circuit 68. The large current flowing in inductor $L_{add}$ goes from flowing in switching circuit 68 to flowing in RC recovery circuit 72. This causes a large spike to occur in the $V_{hp}$ voltage at node 70, which works to turn the current off in inductor $L_{add}$. As the inductor current is "reset" by $V_{hp}$, voltage $V_{hp}$ will fall at a rate determined by the RC network. The values for the RC network need to be selected to provide the proper reset characteristics, such that the additional phase and the main phases work together to provide a desired output response.

The embodiment shown in FIG. 4*a* is best suited for multiphase buck converters for which ND<1. However, those skilled in the art will appreciate that the invention is not limited to this topology, and that alternative configurations can be implemented to improve the response of other converter topologies.

Note that, although only two main phases are shown in FIGS. 2, 3*a* and 4*a*, the invention can be extended to any number of phases.

While particular embodiments of the invention have been shown and described, numerous variations and alternate embodiments will occur to those skilled in the art. Accordingly, it is intended that the invention be limited only in terms of the appended claims.

I claim:

1. A multiple-phase DC—DC converter, comprising:
   an N-phase switching regulator which provides an output voltage $V_{out}$ at an output terminal, each of said phases comprising:
   an output inductor, and
   a switching circuit which switches current to and from said output inductor in response to a respective control signal;
   a control circuit which provides said N control signals to said N phases during a switching cycle which has a period T and a frequency f1, said control signals phase-shifted by T/N with respect to each other such that said phases are synchronously switched in a prescribed sequence, said phases providing respective phase currents which are summed together; and
   at least one additional phase, each of said additional phases comprising a current generating circuit which provides a current $I_{hp}$ in response to a control signal, said current $I_{hp}$ having a switching frequency f2 which is equal to or greater than f1, said current $I_{hp}$ summed with said N phase currents to provide an output current $I_{out}$ to a load connected to said output terminal, said current $I_{hp}$ providing energy which improves the converter's response to load changes.

2. The DC—DC converter of claim 1, wherein said current generating circuit comprises:
   a driver connected to receive said additional phase's control signal and to toggle an output in response,
   an output inductor connected between said output terminal and a common node, and
   a switching circuit connected to said common node and arranged to conduct current to and from said current generating circuit's output inductor in response to said driver output to provide said current $I_{hp}$.

3. The DC—DC converter of claim 2, wherein said current generating circuit further comprises a logic gate which receives said N control signals at respective inputs and provides said additional phase's control signal at an output such that the switching frequency f2 of said additional phase's control signal is equal to N*f1.

4. The DC—DC converter of claim 2, wherein said switching circuit comprises:
   a first transistor connected between a supply voltage and said common node, and
   a second transistor connected between said common node and ground,
   said current generating circuit arranged such that said second transistor is turned off and said first transistor is turned on and conducts current between said supply voltage and said current generating circuit's output inductor when said driver output is in a first state, and such that said first transistor is turned off and said second transistor is turned on and conducts current between said current generating circuit's output inductor and ground when said driver output is in a second state.

5. The DC—DC converter of claim 4, further comprising a capacitor connected between said common node and said output inductor such that current $I_{hp}$ is substantially an AC current.

6. The DC—DC converter of claim 5, wherein each of said additional phases has a higher switching frequency and a smaller output inductor than do said N phases such that said additional phase's output current $I_{hp}$ responds faster to load changes than do said N phase currents, and said N phases exhibit a higher efficiency than said additional phases.

7. The DC—DC converter of claim 1, wherein said control signals are pulse-width modulated (PWM).

8. The DC—DC converter of claim 1, wherein said control circuit is arranged to inhibit the operation of said N phases when said load is below a predetermined level, such that $I_{out}$ is entirely provided by said at least one additional phase.

9. A multiple-phase DC—DC converter, comprising:
an N-phase switching regulator which provides an output voltage $V_{out}$ at an output terminal, each of said phases comprising:
an output inductor, and
a switching circuit which conducts current to and from said output inductor in response to a respective control signal;
a control circuit which provides said N control signals to said N phases during a switching cycle which has a period T and a frequency f, said control signals phase-shifted by T/N with respect to each other such that said phases are synchronously switched in a prescribed sequence, said phases providing respective phase currents which are summed together; and
at least one additional phase, each of said additional phases comprising:
a logic gate which receives said N control signals at respective inputs and combines them into a single control signal which has a switching frequency equal to N*f,
a driver connected to receive said single control signal and to toggle an output when any of said N control signals are provided to their respective phases,
an output inductor connected between said output terminal and a common node, and
a switching circuit connected to said common node and arranged to conduct current to and from said output inductor in response to said driver output to provide a current $I_{hp}$ having a switching frequency equal to N*f, said current $I_{hp}$ summed with said N phase currents to provide an output current $I_{out}$ to a load connected to said output terminal, said current $I_{hp}$ providing energy which improves the converter's response to load changes.

10. The DC—DC converter of claim 9, wherein said switching circuit comprises:
a first transistor connected between a supply voltage and said common node, and
a second transistor connected between said common node and ground,
said at least one additional phase arranged such that said second transistor is turned off and said first transistor is turned on and conducts current between said supply voltage and said additional phase's output inductor when said driver output is in a first state, and such that said first transistor is turned off and said second transistor is turned on and conducts current between said common node and said additional phase's output inductor when said driver output is in a second state.

11. The DC—DC converter of claim 10, further comprising a capacitor connected between said common node and said output inductor such that current $I_{hp}$ is substantially an AC current.

12. The DC—DC converter of claim 11, wherein each of said additional phases has a higher switching frequency and a smaller output inductor than do said N phases such that said additional phase's output current $I_{hp}$ responds faster to load changes than do said N phase currents, and said N phases exhibit a higher efficiency than said additional phases.

13. A multiple-phase DC—DC converter, comprising:
an N-phase switching regulator which provides an output voltage $V_{out}$ at an output terminal, each of said phases comprising:
an output inductor, and
a switching circuit which conducts current to and from said output inductor in response to a respective pulse-width modulated (PWM) control signal;
a control circuit which provides said N control signals to said N phases during a switching cycle which has a period T and a frequency f, said control signals phase-shifted by T/N with respect to each other such that said phases are synchronously switched in a prescribed sequence, said phases providing respective phase currents which are summed together to provide an output current $I_{out}$ to a load connected to said output terminal, the duty cycles of said N PWM control signals varying with said load, and
at least one additional phase arranged to reduce $I_{out}$ by a current $I_{hp}$ when the duty cycles of all of said control signals are approximately zero due to a load release, to reduce $V_{out}$ overshoot that might otherwise occur in response to said load release.

14. The DC—DC converter of claim 13, wherein said control circuit further provides a clock signal Fclk which is pulsed at the start of each of said N control signals' switching periods such that Fclk has a frequency N*f, each of said additional phases comprising:
a logic gate which receives said N control signals and combines them into a single control signal Fpwm which has a switching frequency equal to N*f when the duty cycles of said N control signals is non-zero,
a reset-dominate flip-flop connected to receive said control signal Fpwm at its reset input and said clock signal Fclk at its set input such that said flip-flop's output is reset whenever a non-zero Fpwm control signal is received and is set whenever Fpwm is zero when Fclk is received, and
an output current reduction circuit coupled to said flip-flop output and arranged to conduct said current $I_{hp}$ when said flip-flop output is set.

15. The DC—DC converter of claim 14, wherein each of said output current reduction circuits comprises:
an output inductor connected between said output terminal and a common node and which conducts current $I_{hp}$, and
a switching circuit connected between said common node and a ground terminal and arranged such that said switching circuit conducts current from said output inductor to ground when said flip-flop output is set.

16. The DC—DC converter of claim 15, wherein said N phases are arranged such that the maximum slew rate $S_{off}$ at which said N phases can reduce $I_{out}$ in response to a load release is given by:

$$S_{off} = -ND(VCC/L),$$

where VCC is said N-phase switching regulator's input voltage, D is given by $V_{out}/VCC$, and L is the inductance of the active phase's output inductor, the output current $I_{hp}$ of each additional phase having a slew rate $S_{hp}$ which increases the overall slew rate $S_{ft}$ at which said DC—DC converter can reduce $I_{out}$ in response to a load release, $S_{ft}$ given by:

$$S_{ft} = S_{off} - S_{hp} = -[(N/L) + (1/L_{ph})]*D*VCC,$$

where $L_{ph}$ is the inductance of said output current reduction circuit's output inductor.

17. The DC—DC converter of claim 15, wherein said output current reduction circuit further comprises:
   an RC network connected between said common node and a supply voltage, and
   a diode connected between said common node and said supply voltage,
   such that the current in said output current reduction circuit's output inductor is reset to zero when said flip-flop is reset.

18. The DC—DC converter of claim 13, wherein said multiple-phase DC—DC converter is a buck converter having an input voltage VCC, said buck converter arranged such that ND<1, where D is given by $V_{out}/VCC$.

19. A multiple-phase DC—DC converter, comprising:
   an N-phase switching regulator which receives an input voltage VCC, provides an output voltage $V_{out}$ at an output terminal, and is arranged such that ND<1, where D is given by $V_{out}/VCC$, each of said phases comprising:
      an output inductor, and
      a switching circuit which conducts current to and from said output inductor in response to a respective pulse-width modulated (PWM) control signal;
   a control circuit which provides said N control signals to said N phases during a switching cycle which has a period T and a frequency f, said control signals phase-shifted by T/N with respect to each other such that said phases are synchronously switched in a prescribed sequence, said phases providing respective phase currents which are summed together to provide an output current $I_{out}$ to a load connected to said output terminal, the duty cycles of said N PWM control signals varying with said load, said control circuit further providing a clock signal Fclk which is pulsed at the start of each of said N control signals' switching periods such that Fclk has a frequency N*f, and
   at least one additional phase arranged to reduce $I_{out}$ by a current $I_{hp}$ when the duty cycles of all of said control signals are approximately zero due to a load release, to reduce $V_{out}$ overshoot that might otherwise occur in response to said load release, each of said additional phases comprising:
      a logic gate which receives said N control signals and combines them into a single control signal Fpwm which has a switching frequency equal to N*f when the duty cycles of said N control signals is non-zero,
      a reset-dominate flip-flop connected to receive said control signal Fpwm at its reset input and said clock signal Fclk at its set input such that said flip-flop's output is reset whenever a non-zero Fpwm control signal is received and is set whenever Fpwm is zero when Fclk is received, and
      an output current reduction circuit coupled to said flip-flop output and arranged to conduct said current $I_{hp}$ when said flip-flop output is set.

20. The DC—DC converter of claim 19, wherein said output current reduction circuit comprises:
   an RC network connected between a common node and a supply voltage,
   a diode connected between said common node and said supply voltage,
   an output inductor connected between said output terminal and said common node and which conducts current $I_{hp}$, and
   a switching circuit connected between said common node and a ground terminal and arranged to conduct current from said output current reduction circuit's output inductor to ground when said flip-flop output is set and such that the current in said output current reduction circuit's output inductor is reset to zero when said flip-flop is reset.

21. The DC—DC converter of claim 20, wherein said N phases are arranged such that the maximum slew rate $S_{off}$ at which said N phases can reduce $I_{out}$ in response to a load release is given by:

$$S_{off} = -ND(VCC/L)$$

where VCC is said N-phase switching regulator's input voltage, D is given by $V_{out}/VCC$, and L is the inductance of the active phase's output inductor, the output current $I_{hp}$ of each additional phase having a slew rate $S_{hp}$ which increases the overall slew rate $S_{ft}$ at which said DC—DC converter can reduce $I_{out}$ in response to a load release, $S_{ft}$ given by:

$$S_{ft} = S_{off} - S_{hp} = -[(N/L) + (1/L_{ph})]*D*VCC,$$

where $L_{ph}$ is the inductance of said output current reduction circuit's output inductor.

* * * * *